(No Model.)
O. PROUST.
PETROLEUM STOVE.
No. 432,438. Patented July 15, 1890.
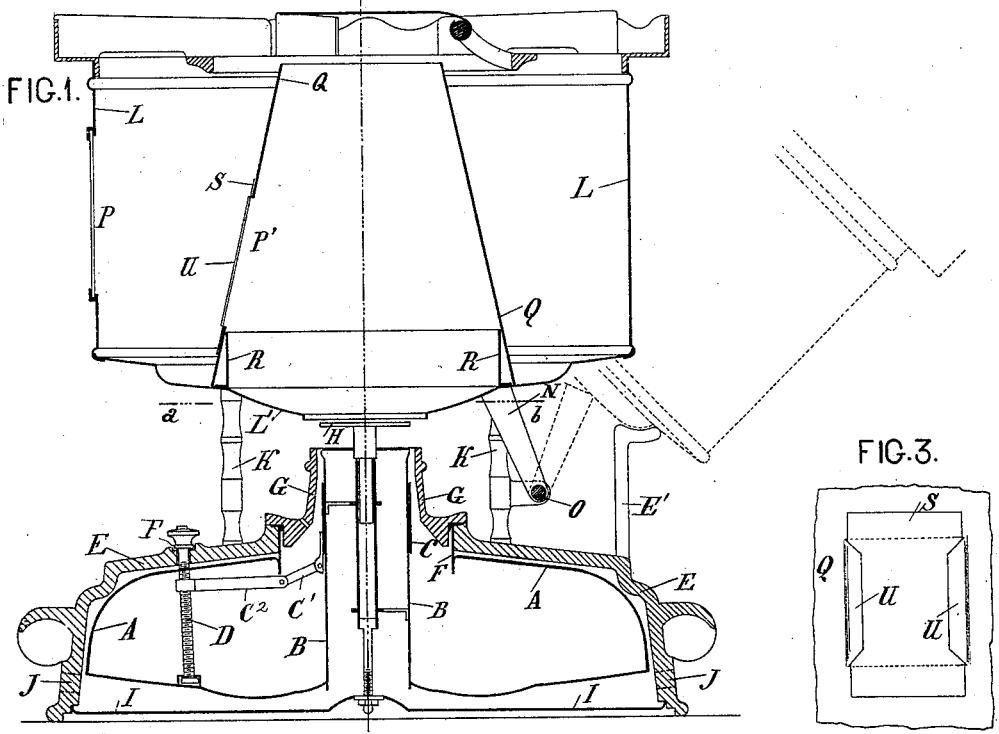
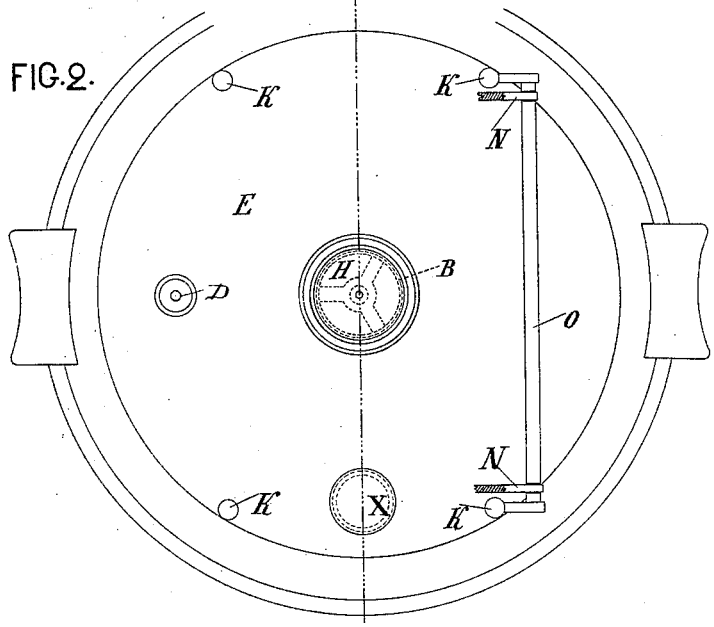
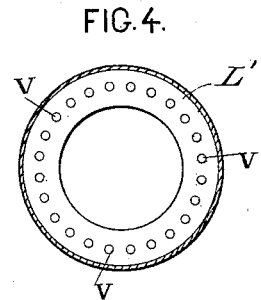
WITNESSES:
J. Henry Theberath
C. Sedgwick
INVENTOR:
O. Proust
BY Munn & Co.
ATTORNEYS.

UNITED STATES PATENT OFFICE.

OLIVIER PROUST, OF PARIS, FRANCE.

PETROLEUM-STOVE.

SPECIFICATION forming part of Letters Patent No. 432,438, dated July 15, 1890.

Application filed February 14, 1890. Serial No. 340,445. (No model.) Patented in France December 1, 1887, No. 187,352.

*To all whom it may concern:*

Be it known that I, OLIVIER PROUST, of Paris, France, have invented a new and Improved Petroleum-Stove, (which has been patented in France, dated December 1, 1887, and numbered 187,352,) of which the following is a full, clear, and exact description.

The object of the invention is to provide a new and improved petroleum-stove, which is simple and durable in construction, utilizes fuel to the best advantage, and insures complete combustion and absolute safety.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a sectional side elevation of the improvement. Fig. 2 is a plan view of the same with the heater removed. Fig. 3 is a side elevation of part of the chimney and its mica window, and Fig. 4 is a sectional plan view of the bottom of the heater on the lines *a b* of Fig. 1.

In oil-stoves as heretofore manufactured the combustion takes place at the upper part of the burner, which, like the fount, has usually been made of metal, and as the latter is a very good conductor of heat the petroleum or fuel contained in the fount is heated and vaporizes. This frequently causes explosions. To overcome this and to render the burner as safe as possible is the principal object of the invention presently to be described.

The fount A, for receiving the petroleum, is provided with the usual central tube B, and both are made of metal. On the central tube B is held to slide the wick-holder C, connected by a link C' with an arm C², screwing on a screw-rod D, mounted to turn in suitable bearings in the fount A and extending through the top of the casing E by being provided with a flanged neck F, resting on the neck of the casing E, on the top of which is held the burner G, which, with the casing E, is made of a non-conducting material, preferably porcelain, glass, &c.

The disk H, for conducting or deflecting the air to the flame, is fixed in the central tube B in the usual manner, and extends above the burner G and the said central tube to within a short distance of the central opening in the bottom L' of the heater L, located above the casing E and supported from the latter by suitable posts K. The bottom I cf the casing E is formed of sheet metal, and extends a suitable distance below the bottom of the fount A, so as to form an air-space around the fount A within the casing E. Air from the outside can pass through openings J in the casing E to this air-space, and from the latter through the central tube B to the upper end of the burner G. The air confined in this air-space increases the insulation of the receptacle or casing E from the fount A.

It is understood that I can, if desired, make only the burner of insulating material and dispense entirely with the double casing without departing from the spirit of my invention; but I prefer to use the double casing, not only for the sake of insulation, which is absolute, but also on account of cleanliness.

The bottom L' of the heater L is provided with a row of apertures V, arranged in a circle, as is plainly illustrated in Fig. 4, and serving to supply the flame with air within the heater L. The heater L is provided with arms N, extending downward, and pivoted on a transversely-extending pin O, held removably in suitable bearings on two oppositely-arranged posts K. By this means the heater L can be swung into an inclined position, as shown in dotted lines in Fig. 1, the heater then resting on the bracket E', fixed to the casing E.

On the bottom of the heater is arranged a collar R, on which is fitted the lower end of the conical chimney Q, provided with an opening P', covered by mica S or other transparent material, the mica being held in place by lugs U, formed in the chimney and bent over the said mica, as plainly illustrated in Figs. 1 and 3.

Opposite the mica S in the body of the heater L is formed a window P, which permits, in connection with the mica S, of viewing the flame inside of the chimney Q. The upper part of the heater L is arranged in the usual manner for supporting articles to be heated. The chimney Q is made removable from the heater L, so as to permit of conveniently cleaning the interior of the heater in case of substances being spilled in the same.

It is understood that the apertures V in the bottom L' of the heater L prevent the rapid burning of that part of the heater near the burner, at the same time permitting the air passing through the said openings to cool the sheet metal, of which the bottom of the casing is formed, thus keeping the latter at a reasonable temperature. After the air has passed through the opening and has cooled the casing it passes to the flame, mingles with it, and considerably augments its calorific power.

In the top of the casing E and the fount A is arranged the usual filling-opening X for filling the fount A with the fuel to be burned.

Having thus fully described my invention, I claim as new and desire to secure by Letters Patent—

1. In an oil-stove, the combination, with a metal fount, of an outer casing of non-conducting material surrounding the fount and forming an air-space entirely around said fount, the said casing being provided with openings for the admission of air to said air-space, substantially as described.

2. In an oil-stove, the combination, with a metal fount provided with a central tube projecting through its bottom, of a casing of non-conducting material surrounding the metal fount and forming an air-space around the same, the said casing being provided with openings near its bottom, substantially as herein shown and described.

3. In an oil-stove, the combination, with the metal fount A, provided with the central tube B, projecting through the bottom, of the casing E, of non-conducting material, surrounding the fount and having openings J near its bottom, and the burner G, of non-conducting material, resting upon the casing E around the tube B, substantially as herein shown and described.

In testimony that I claim the foregoing as my own I have hereunto affixed my signature in presence of two witnesses.

O. PROUST.

Witnesses:
A. BOURNET,
J. L. RATHBONE.